April 13, 1954     R. W. AMANN     2,675,259
EXTENSIBLE FASTENER DEVICE
Filed Oct. 31, 1950
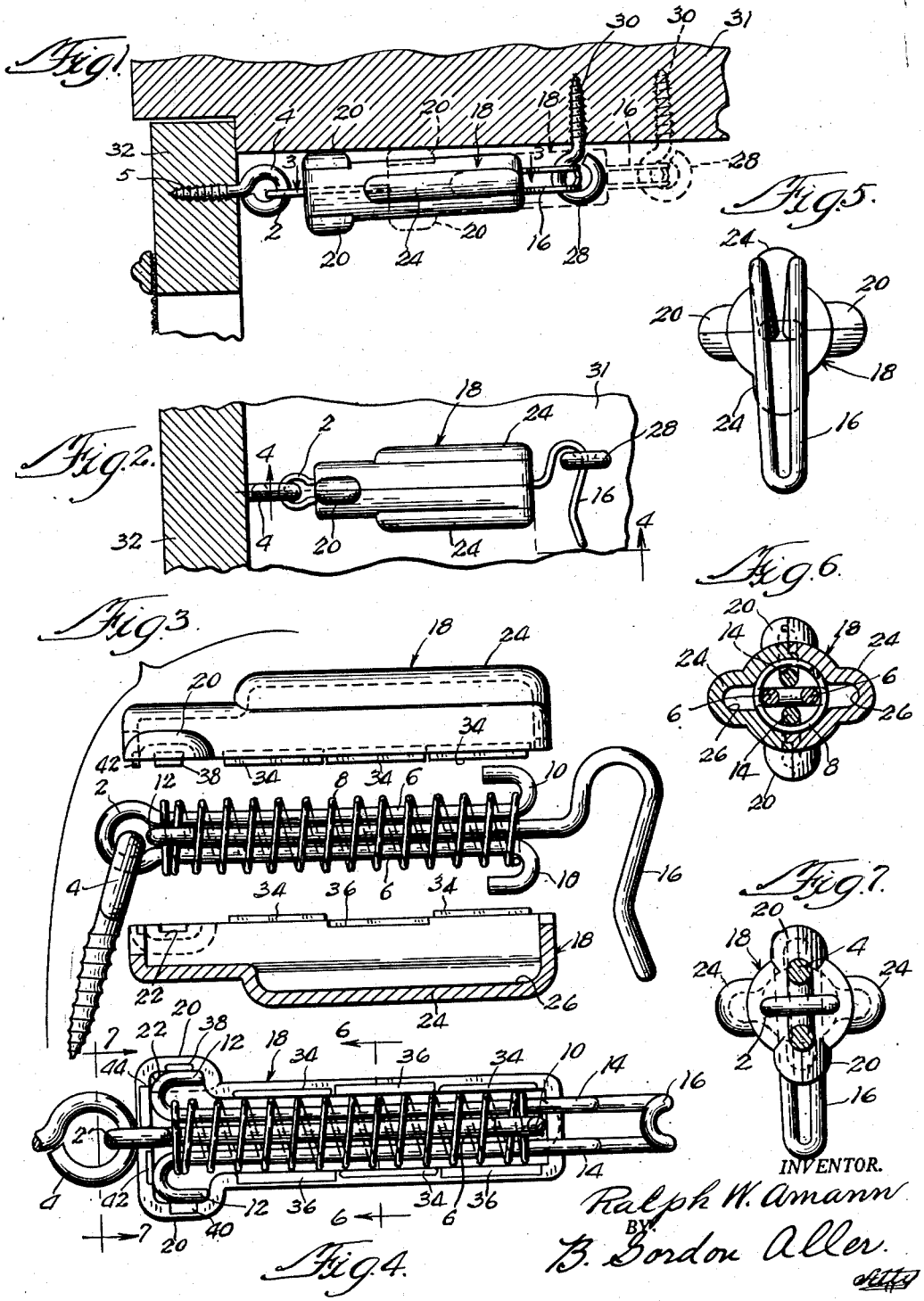
INVENTOR.
Ralph W. Amann
BY B. Gordon Allen Patented Apr. 13, 1954

2,675,259

UNITED STATES PATENT OFFICE 2,675,259

EXTENSIBLE FASTENER DEVICE

Ralph W. Amann, Chicago, Ill.

Application October 31, 1950, Serial No. 193,201

7 Claims. (Cl. 292—114)

This invention relates to fastener devices and more particularly to a resilient extensible fastener of the type disclosed in my United States Letters Patent No. 2,094,516, issued September 28, 1937, for Hook. In this type of fastener, a hook and an anchor are provided with reaches sleeved through and connected to opposite ends of a spring which is compressed as the device is extended to engage the hook with another anchor.

A primary object of the present invention is to prevent injury to the fingers of the user and to provide a convenient finger hold to facilitate extension of the fastener.

Another object of the invention is to positively maintain the reaches of the hook and anchor, respectively, against substantial relative rotative movement about the axis of the spring, thereby preventing jamming and binding of the parts.

A further object of the invention is to prevent abrasion and scratching of the member to which the hook is fastened, by providing bearings for the portions of the hook reaches which are engaged with the spring.

A more specific object of the invention is to devise a novel casing or housing for the spring and to provide the casing with hollow bosses or protuberances having sockets for anchoring the ends of the hook reaches thereto.

Still another object of the invention is to provide the casing with winglike protuberances having internal guide sockets for reception of the anchor reaches, the protuberances being spaced from the rear extremity of the casing to afford a convenient fingerhold for the user.

The foregoing and other objects of the invention will become apparent from a consideration of the following specification and the accompanying drawings, wherein:

Fig. 1 is a top plan view of a fastener embodying the invention;

Fig. 2 is a side elevational view of the device shown in Fig. 1;

Fig. 3 is an enlarged, partly exploded top plan view of the fastener with one-half of the casing shown in section on the line 3—3 of Fig. 1;

Fig. 4 is a sectional view of Fig. 2 on the line 4—4;

Fig. 5 is a front elevational view of the fastener;

Fig. 6 is a sectional view of the fastener taken in the plane indicated by the line 6—6 of Fig. 4; and Fig. 7 is a sectional view on the line 7—7 of Fig. 4.

Describing the invention in detail the fastener is of the type disclosed in my above-mentioned letters patent and comprises an anchor 2 preferably in the form of an eyelet, within which is disposed the eye 4 of a conventional screw 5. The anchor 2, as best seen in Figs. 3 and 4, comprises a pair of reaches 6 sleeved through a spring 8, herein illustrated in the form of a coil spring. The reaches 6 are provided with means in the form of hooks 10 engaged with one end of the coil spring 8. The opposite end of the spring is similarly engaged by hooks 12 of reaches 14 sleeved through the spring and connected to a fastener hook 16.

According to the present invention, the spring 8 and the reaches 6 and 14 are disposed within a hollow casing or housing generally designated 18. The housing comprises a pair of hollow, winglike bosses or protuberances 20 at one end thereof, and the protuberances are formed with internal sockets 22 receiving the hooks 12 which are snugly confined within the sockets 22 to anchor the reaches 14 to the casing 18.

The casing 18 also comprises a pair of hollow winglike protuberances 24 extending lengthwise from its opposite end and having internal guide passages or slots 26, within which the hooks 10 of reaches 6 are reciprocal as the spring 8 is compressed to accommodate insertion of the hook 16 in an eye 28, as shown in Fig. 1, wherein the eye 28 is illustrated as part of a conventional screw 30 in a door frame 31, and the above-mentioned screw 5 is illustrated as secured to a screen door 32. It will be understood that this use of the fastener is merely illustrative and constitutes no limitation of the present invention.

As best seen in Figs. 1 and 2 the protuberances 20 lie in a plane bisecting the longitudinal axis of the casing 18 which is coaxial with the spring 8, and the protuberances 24 lie in another plane bisecting said axis and disposed approximately perpendicular to the plane of the protuberances 20. Thus the hooks 12 of the reaches 14 and the hooks 10 of the reaches 6 are positively maintained in a predetermined, relative angular relationship with respect to the axis of the spring 8, and relative rotative movement of the reaches 6 and 14 about the axis of the spring 8 is positively limited, thereby preventing binding or jamming of the parts and reducing to a minimum any frictional resistance to extension of the fastener.

Furthermore, as best seen in Figs. 1 and 2, the protuberances 24 are spaced lengthwise of the casing from the protuberances 20 to accommodate a fingerhold between the protuberances 20 and 24 which are arranged about 90° apart about the longitudinal axis of the casing, whereby the fingers of the user may grasp the casing 18 and may push against the rear extremities of the protuberances 24 to compress the spring 8 and engage the hook 16 with the eye 28.

It may also be noted, as seen in Fig. 1, that the inner protuberance 20 functions as a bearing against the door frame 31, along which bearing the casing 18 may slide as the hook 16 is applied and released with respect to the eye 28. This arrangement avoids injury to the fingers of the user and prevents abrasion and scratching of a part, such as the door frame 31, to which the eye 28 may be attached. To more clearly illustrate this feature, the screw 30 and the novel fastener are shown by phantom lines in Fig. 1, in a position whereat greater extension of the fastener is required because of greater distance between the eye 28 and the eye 4.

As best seen in Figs. 3 and 4, the casing 18 is preferably formed of plastics as, for example, by molding, and comprises mating sections each constituting one-half of the casing which is thus divided along a plane bisecting the protuberances 20 and the longitudinal axis of the casing, as clearly shown in Figs. 2 and 5. Each half of the casing comprises alternately arranged tongues and grooves 34 and 36, respectively, adapted to mate with complementary tongues and grooves of the other half of the casing. Also, the boss portions 20 of each half of the casing are provided with a tongue and a groove 38 and 40, respectively, adapted to mate with a complementary groove and tongue of the other half of the casing, and the rear extremity of each casing section is provided with a tongue and a groove 42 and 44, respectively, adapted to mate with corresponding parts of the other casing section. The casing sections may be assembled, as shown in Fig. 2, with the various tongues and grooves in mating relationship and may be secured to each other as by an adhesive or by fusing the sections to each other, as may be desired.

Thus it will be seen that I have devised a novel resilient extensible fastener wherein the parts are positively maintained against binding or jamming and wherein abrasion or scratching of members connected by the fastener is positively prevented. Furthermore, I have provided a novel casing particularly adapted to afford a convenient fingerhold for the user and to provide guide means for the parts housed therein.

Changes may be made in form and construction without departing from the spirit of the invention or sacrificing any of the advantages, and the right is hereby reserved to make all changes as fairly fall within the scope of the following claims.

What is claimed as new and desired to be secured by Letters Patent of the United States is as follows:

1. A hook fastener comprising a spring, a hook having a pair of reaches sleeved within the spring, means on said reaches engaged with one end of the spring, an anchor having a pair of reaches sleeved within said spring, means on said anchor reaches engaged with the opposite end of the spring, a casing containing said spring and said means, said casing having hollow guides projecting from opposite sides thereof and containing the engaging means of one pair of reaches, said casing having hollow bosses projecting from opposite sides thereof and containing the engaging means of another pair of reaches, said bosses snugly confining the engaging means of the other pair of reaches to anchor the casing thereto, the guides being spaced lengthwise of the casing from said bosses, the guides and bosses, respectively, lying in substantially mutually perpendicular mid planes to the casing.

2. An extensible hook fastener comprising a spring, a hook with reaches sleeved through the spring and having parts connected to one end thereof, an anchor with reaches sleeved through the spring and having parts connected to the other end thereof, a casing containing the spring, hollow lugs on one end of the casing snugly confining the reach parts of the hook to anchor the casing thereto, and hollow protuberances on the other end of the casing having elongated guide slots guidably receiving the reach parts of the anchor, said protuberances being spaced lengthwise of the casing from said lugs, said protuberances and lugs, respectively, being positioned in planes which are at an angle to each other to afford a finger grip between the protuberances and the lugs.

3. An extensible fastener device comprising a spring, a hook with reaches sleeved through the spring and having parts engaged with an end thereof, an anchor with reaches sleeved through the spring and having parts engaged with the opposite end thereof, a casing sleeved over the spring and having protuberances projecting from the sides thereof, each of said protuberances containing one of said parts, the protuberances containing the anchor parts extending lengthwise of the casing for a major portion of its length to accommodate travel thereof as said spring is compressed, and the protuberances containing the hook parts snugly confining the same to anchor the hook thereto.

4. An extensible fastener device comprising a hollow casing with protuberances projecting from its sides, a spring in the casing, a hook comprising reaches sleeved through the spring and having parts secured to one end thereof, an anchor comprising reaches sleeved through the spring and having parts secured to the other end thereof, the hook parts being snugly confined within certain protuberances in said casing to engage the casing therewith, and the anchor parts being guidably reciprocal in other of said protuberances in said casing.

5. An extensible fastener device comprising a spring, a pair of reaches sleeved through the spring and having parts engaging with one end thereof, another pair of reaches sleeved through the spring and having parts engaging with the other end thereof, a casing surrounding the spring and anchored to one pair of reaches for movement in unison therewith, and guide means on the casing engaged with the other pair of reaches for accommodating movement of the casing relative thereto along the longitudinal axis of the spring and for positively limiting rotative movement of the casing about said axis with respect to the last-mentioned pair of reaches.

6. A casing for a hook fastener, the combination of an elongated spring housing having openings at its ends, a pair of hollow protuberances at opposite sides of said housing, another pair of elongated hollow protuberances at opposite sides of said housing extending lengthwise thereof, said elongated protuberances having internal guide slots, the protuberances of one pair being arranged about the longitudinal axis of the housing oppositely to the protuberances of the other pair and being spaced therefrom lengthwise of the housing.

7. An extensible hook fastener comprising a hook with reaches sleeved through the spring and having parts connected at one end thereof, an anchor with reaches sleeved through the spring and having parts connected at the other end thereof, a casing containing said spring, means at one end of the casing to snugly confine the reach parts of the hook and to secure said parts in the casing, and means at the other end of said casing for guiding the reach parts of the anchor in substantially linear movement relative to the reach parts of the hook.

References Cited in the file of this patent

UNITED STATES PATENTS

| Number | Name | Date |
|---|---|---|
| 1,023,680 | Protz | Apr. 16, 1912 |
| 1,482,643 | Etheridge | Feb. 5, 1924 |
| 1,670,117 | Liverance | May 15, 1928 |
| 1,788,707 | Crowder | Jan. 13, 1931 |
| 2,094,516 | Amann | Sept. 28, 1937 |